United States Patent [19]

Ueda et al.

[11] 4,127,151

[45] Nov. 28, 1978

[54] APPARATUS FOR TRANSFER OF POWDER INTO HIGH-PRESSURE VESSEL AND METHOD FOR TRANSFER

[75] Inventors: Shigeru Ueda; Shinichi Yokoyama; Yoshinori Nakata; Yoshihisa Hasegawa; Ryoichi Yoshida; Yousuke Maekawa; Yuji Yoshida; Kazuo Makino, all of Sapporo, Japan

[73] Assignee: Agency of Industrial Science & Technology, Tokyo, Japan

[21] Appl. No.: 741,301

[22] Filed: Nov. 12, 1976

[30] Foreign Application Priority Data

Nov. 26, 1975 [JP] Japan .......................... 50-142061

[51] Int. Cl.² ............................................. G01F 11/18
[52] U.S. Cl. ........................................ 141/5; 222/216; 222/361
[58] Field of Search ................... 222/216, 217, 361; 141/249, 81, 5

[56] References Cited

U.S. PATENT DOCUMENTS

| | | | |
|---|---|---|---|
| 1,574,813 | 3/1926 | Hafner | 222/361 X |
| 1,789,051 | 1/1931 | Opitz | 222/216 |
| 3,285,669 | 11/1966 | Clark | 222/361 X |
| 3,521,793 | 7/1970 | McShirley | 222/216 |
| 3,994,418 | 11/1976 | Andersson | 222/361 X |

*Primary Examiner*—Robert B. Reeves
*Assistant Examiner*—Frederick R. Handren
*Attorney, Agent, or Firm*—Kurt Kelman

[57] ABSTRACT

An apparatus for the transfer of powder into a high-pressure vessel comprises a cylinder, two pistons disposed one on top of the other inside said cylinder and two openings formed in the circular wall of the cylinder, the one opening serving as an inlet for entry of the powder and the other opening serving as an outlet for exit of the powder into the high-pressure vessel. The transfer of powder from the powder hopper into the high-pressure vessel by use of said apparatus is accomplished by a method which comprises connecting the inlet of said apparatus to the discharge tube of the powder hopper and the outlet of the apparatus to the powder lead tube of the high-pressure vessel respectively, driving the two pistons so as to interpose a space therebetween communicating with the inlet opening, then moving the pistons in unison for thereby causing said space to move down the cylinder interior to a position in communication with the outlet opening so that the powder in the space can fall into the high-pressure vessel and then driving the pistons together to eliminate the space between them.

2 Claims, 3 Drawing Figures

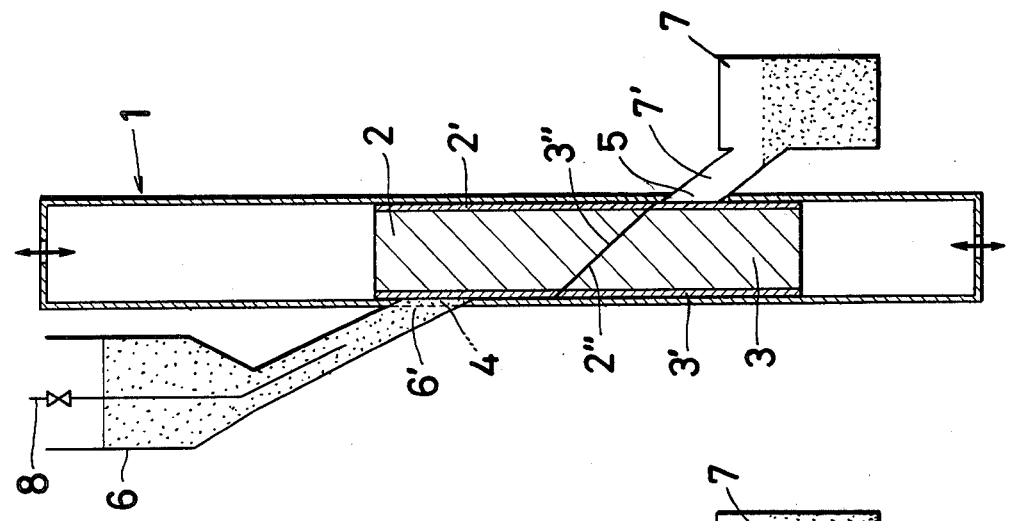
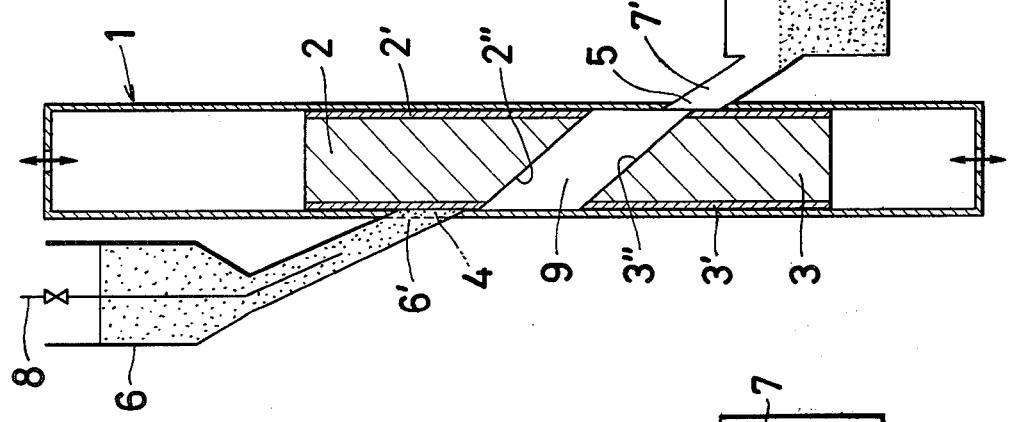
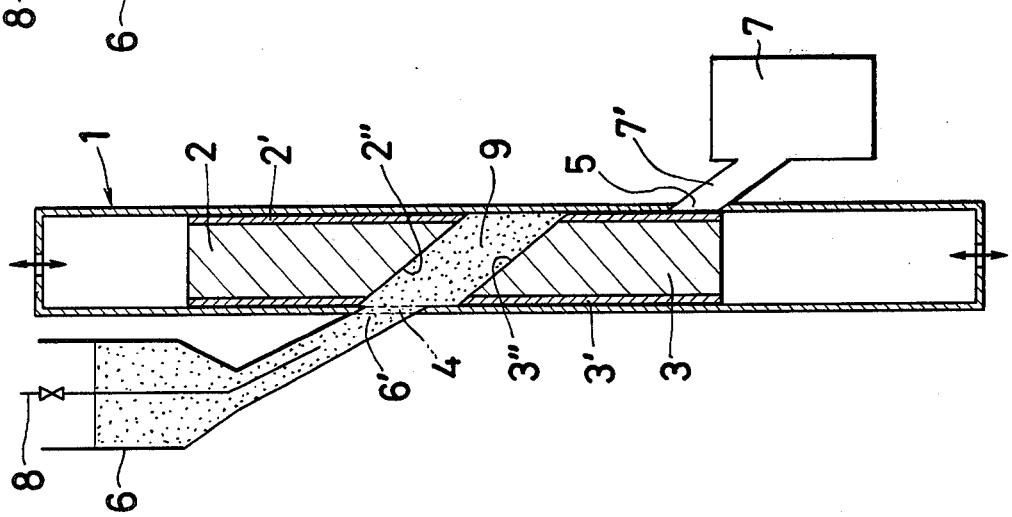

APPARATUS FOR TRANSFER OF POWDER INTO HIGH-PRESSURE VESSEL AND METHOD FOR TRANSFER

BACKGROUND OF THE INVENTION

This invention relates to an apparatus for continuous transfer of powder from a storage tank kept under normal pressure into a high-pressure vessel and to a method for the transfer of powder.

For transfer of powder into a high-pressure vessel, there has generally been employed a lock hopper. Desired transfer of powder into the high-pressure vessel by use of this lock hopper is carried out by a method such as is described below.

First, the powder intended for transfer into the high-pressure vessel and the gas which is required to envelop the received powder inside the high-pressure vessel are introduced into the lock hopper. Then, the lock hopper is locked airtightly and the pressure inside the hopper is increased until it equals the pressure under which the interior of the high-pressure vessel is kept. The hopper is subsequently made to communicate with the high-pressure vessel. Thereafter, the powder conveyor built in the system is manually operated to forward the powder in a required volume from inside the hopper into the high-pressure vessel. To replenish the hopper with the powder, the high-pressure vessel and the lock hopper are separated from each other. After it has been ascertained that the high-pressure gas is not flowing from the vessel into the hopper, the hopper is opened to release the high-pressure gas still remaining therein. Then, the powder is poured into the lock hopper. The air now present inside the lock hopper is displaced with said gas and the pressure inside the lock hopper is again increased, followed by the operation of the powder conveyor. The procedure described above is repeated cyclically.

In this method, the internal pressure of the lock hopper is equalized with that of the high-pressure vessel at the time of delivery of the powder into the high-pressure vessel. If the lock hopper employed in this method happens to be of large dimensions, then quite a large volume of gas should be released from such large lock hopper in order that the internal pressure of the lock hopper may revert to the normal atmospheric pressure. The release of such large volume of gas necessitates either installation of gas holder of considerable size or adoption of a special setup wherein a plurality of smaller lock holders are installed and operated for the pressure of gas to be gradually lowered during the gas' successive flow through said lock holders, whereby the volume of gas to be finally released from the last one of the series of lock holders will be amply decreased and, consequently, the capacity of said gas holder will be minimized.

It follows as a consequence that when the method using such lock hopper is put to practice, it proves to be expensive and entails technical difficulties which prevent the operation from being carried out continuously.

The primary object of the present invention is to provide an apparatus capable of very easily transferring a powder into a vessel maintained under a high pressure without necessitating the release of high-pressure gas which forms an indispensable requirement for effective operation of the known apparatus.

Another object of this invention is to provide a method for easily transferring a powder into a vessel maintained under a high pressure without necessitating the release of high-pressure gas which forms an indispensable requirement for effective operation of the known method.

SUMMARY OF THE INVENTION

To accomplish the objects described above according to this invention, there is provided an apparatus which comprises in combination a vertical pressureproof cylinder, two openings disposed one at a level higher than the other in the circular wall of said cylinder, the one opening at the higher level serving as an inlet for entry of the powder and the other opening at the lower level serving as an outlet for exit of the powder into a high-pressure vessel, and two separately driven pistons disposed vertically inside the cylinder, with the opposed ends thereof inclined relative to the cylinder and parallel to each other. And the method provided by this invention for effecting desired transfer of powder into the high-pressure vessel by use of said apparatus comprises connecting the powder discharge tube of the powder hopper to the inlet of the cylinder for entry of the powder and the powder lead tube of the high-pressure vessel to the outlet of the cylinder for exit of the powder into the high-pressure vessel while having the pistons held where they close said openings, i.e. the inlet and outlet, of the cylinder at the same time, then moving the two pistons so as to interpose a space therebetween at a level such that said space communicates only with the inlet for entry of the powder and admits the powder therein from the powder hopper, subsequently moving the pistons down the cylinder interior so as to enclose said space on all sides, further moving the pistons to a level such that said space communicates only with the outlet of the cylinder and forces the powder held therein to flow out of the cylinder into the high-pressure vessel and finally moving the two pistons toward each other so as to expel the high-pressure gas out of said space into the high-pressure vessel.

BRIEF EXPLANATION OF THE DRAWING

FIG. 1 represents a typical apparatus and method for transfer of powder into the high-pressure vessel according to the present invention, with the apparatus depicted in a state in which the powder is introduced into the space interposed between the two pistons.

FIG. 2 represents the apparatus depicted in a state in which the powder has been introduced into the high-pressure vessel.

FIG. 3 is represents the apparatus depicted in a state in which the space between the two pistons is completely eliminated and the high-pressure gas is completely expelled from the space into the high-pressure vessel.

DETAILED DESCRIPTION OF THE INVENTION

FIG. 1 shows vertical pressureproof cylinder 1 which is provided at an upper portion thereof with an opening 4 for admitting the powder into the cylinder interior and at a lower portion thereof with another opening 5 for transferring the powder held inside the cylinder into the high-pressure vessel 7. Pistons 2 and 3 are disposed inside the cylinder. The pistons have their respective circumferential surfaces covered with fluorinated ethylene resin sheets (such as, for example, a sheet of Teflon (polytetrafluoroethylene) made by DuPont) 2' and 3' which serve as movable packings.

The opposed ends 2" and 3" of the two pistons are parallel with each other and are inclined relative to the horizontal. These pistons are reciprocated independently of each other by known means such as, for example, hydraulic means. By 6 is denoted a powder hopper for receiving the powder for transfer to the high-pressure vessel into which the powder is delivered under increased pressure.

The powder discharge tube 6' extending from the lower end of powder hopper 6 is airtightly connected to the opening 4 of the cylinder and the powder transfer tube 7' extending into the high-pressure vessel is similarly connected to the opening 5 of the cylinder. An inlet pipe 8 for delivery of an inert gas such as nitrogen extends into the powder hopper 6. This inlet pipe 8 is used when the introduction of inert gas is for reasons of safety necessitated by the type of powder (such as a powder having an extremely fine particle size).

Now, the method by which the powder is transferred into the high-pressure vessel by use of the apparatus of this invention will be described.

First, the pistons of the cylinder 1 are so positioned that they close the opening 4 for the entry of the powder and the opening 5 for the delivery of the powder into the high-pressure vessel. With the pistons kept in this position, the openings 4 and 5 of the cylinder are connected airtightly to the powder discharge tube 6' of the powder hopper 6 and the powder transfer tube 7' of the high-pressure vessel 7 respectively. Then, the pistons are driven apart so as to interpose a space 9 therebetween at a level such that space 9 communicates only with the opening 4 of the cylinder, i.e. the opening for entry of the powder. When this condition is assumed, the powder held inside the powder hopper 6 falls into the space 9.

Now, the two pistons are moved down the cylinder interior while the space is maintained therebetween. After the space 9 is out of communication with the opening 4, it is moved down to the level of the opening 5 of the cylinder. FIG. 2 illustrates the apparatus in which the space 9 has descended and reached the position of the opening 5. If space 9 were brought into communication with the opening 5 while it is still maintaining communication, even partially, with the opening 4, then the high-pressure gas held inside the high-pressure vessel would burst through the space and into the hopper. To avoid this danger, it is necessary to move space 9 into communication with the opening 5 only after it has completely moved out of communication with opening 4, namely, after the space is defined completely by the two pistons and the cylinder wall.

While the space is in a completely enclosed state, the powder inside the space slides down to the lowest portion of the space. As the space 9 comes into communication with the opening 5, the space is connected to the powder transfer tube extending into the high-pressure vessel and, consequently, the internal pressure of the space is equalized with that of the high-pressure vessel, with the result that the powder is allowed to flow down into the high-pressure vessel by virtue of gravity.

After the powder has been completely transferred into the high-pressure vessel, the pistons are moved toward each other so as to completely eliminate the space, whereby the high-pressure gas is expelled out of the space into the high-pressure vessel. FIG. 3 illustrates the apparatus in a state in which the space has been completely eliminated and the high-pressure gas has been transferred into the high-pressure vessel.

Where the volume of the powder to be transferred into the high-pressure vessel is so large that just one cycle of the procedure described above fails to complete the transfer, it will suffice to repeat the procedure as many times as required.

The levels in which the openings 4 and 5 formed in the circular wall of the pressureproof cylinder 1 fall are advantageously fixed by taking full account of the requirement that desired transfer of the powder into the high-pressure vessel should be accomplished solely by moving the pistons vertically in the cylinder interior without the pistons having to be rotated around their axes in the course of movement. In the event that the pistons are rotatably disposed in the cylinder, the levels of the openings 4 and 5 may be freely selected.

For the operation of these pistons, hydraulic means or any other known actuating mechanism may be used. The means for sealing the high-pressure gas inside the cylinder is not limited to fluorinated ethylene resin packings.

What is claimed is:

1. An apparatus for transferring a powder into a high-pressure vessel, which comprises the combination of
   (a) a vertical pressure-proof cylinder defining
      (1) a powder inlet opening having an upper and a lower edge in an upper portion of the cylinder and
      (2) a powder outlet opening having an upper and a lower edge in a lower portion of the cylinder,
   (b) an upper piston pressure-tightly disposed inside the cylinder in the upper portion thereof, the upper piston having an inclined lower surface extending from an upper to a lower edge thereof,
      (1) the upper piston being arranged for reciprocation between an ascended state wherein the upper edge of the inclined lower surface of the upper piston is positioned at or above the upper edge of the inlet opening and a descended state wherein the lower edge of the inclined lower surface of the upper piston is positioned at or below the upper edge of the outlet opening while the upper piston closes the inlet opening, and
   (c) a lower piston pressure-tightly disposed inside the cylinder in the lower portion thereof, the lower piston having an inclined upper surface parallel to the inclined lower surface of the upper piston and extending from an upper to a lower edge,
      (1) the lower piston being arranged for reciprocation between a descended state wherein the lower edge of the inclined upper surface of the lower piston is positioned at or below the lower edge of the outlet opening and an ascended state wherein the upper edge of the upper surface of the lower piston is positioned at or below the lower edge of the inlet opening while the lower piston closes the outlet opening.

2. A method for transferring a powder from a vertical pressure-proof cylinder defining a powder inlet opening having an upper and a lower edge in an upper portion of the cylinder and a powder outlet opening having an upper and a lower edge in a lower portion of the cylinder into a high-pressure vessel without decreasing the pressure in the vessel, which comprises
   (a) disposing pressure-tightly inside the cylinder an upper piston having an inclined lower surface extending from an upper to a lower edge thereof and a lower piston having an inclined upper surface parallel to the inclined lower surface of the upper piston and extending from an upper to a lower edge, (b) connecting the powder inlet opening to a powder discharge tube and the powder outlet opening to a powder transfer tube leading to the high-pressure vessel, (c) reciprocating the upper piston into a descended state wherein the upper piston closes the inlet opening and reciprocating the lower piston into an ascended state wherein the lower piston closes the outlet opening until the inclined surfaces of the pistons come into tight contact, (d) subsequently reciprocating the upper piston in relation to the lower piston until a space communicating with the inlet opening is interposed between the pistons while the lower piston closes the outlet opening whereby powder from the discharge tube enters into the space, (e) subsequently reciprocating the upper piston and the lower piston in unison with the powder in the space until the space is out of communication with the inlet opening and defined solely by the inclined piston surfaces and the pressure-proof cylinder thereby permitting the powder to flow by gravity through the space, (f) subsequently moving the upper and lower pistons in unison until the space with the powder therein communicates with the outlet opening while the upper piston closes the inlet opening whereby the pressure in the space is equalized with that in the high-pressure vessel and the powder flows by gravity from the space into the vessel, (g) subsequently reciprocating the upper piston and the lower piston until the inclined piston surfaces come into tight contact whereby the space is eliminated and the high-pressure gas is expelled from the space into the high-pressure vessel, and (h) subsequently moving the upper and lower pistons in unison while keeping the tight contact between the piston surfaces until the upper piston closes the inlet opening and the lower piston closes the outlet opening.

* * * * *